(12) United States Patent
Park et al.

(10) Patent No.: US 8,811,405 B2
(45) Date of Patent: Aug. 19, 2014

(54) SYSTEM AND METHOD FOR PROVIDING IPTV SERVICE

(75) Inventors: Pyung-Koo Park, Daejeon (KR); Nam Seok Ko, Daejeon (KR); Jong Dae Park, Daejeon (KR); Sung Kee Noh, Daejeon (KR); Soon Seok Lee, Daejeon (KR); Sung Back Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 200 days.

(21) Appl. No.: 12/858,631

(22) Filed: Aug. 18, 2010

(65) Prior Publication Data

US 2011/0044337 A1 Feb. 24, 2011

(30) Foreign Application Priority Data

Aug. 19, 2009 (KR) .................. 10-2009-0076909
Jul. 7, 2010 (KR) .................. 10-2010-0065429

(51) Int. Cl.
*H04L 12/28* (2006.01)

(52) U.S. Cl.
USPC ............ 370/395.21; 370/395.32; 370/395.54; 370/401; 370/409; 370/432

(58) Field of Classification Search
USPC ................... 370/312, 390, 392, 395.2, 395.3, 370/395.31, 432
See application file for complete search history.

(56) References Cited

U.S. PATENT DOCUMENTS

| | | | | |
|---|---|---|---|---|
| 2004/0190542 | A1* | 9/2004 | Ono et al. | 370/432 |
| 2004/0223465 | A1* | 11/2004 | Lee et al. | 370/313 |
| 2006/0117342 | A1* | 6/2006 | Park et al. | 725/37 |
| 2008/0298321 | A1* | 12/2008 | Lee et al. | 370/331 |

FOREIGN PATENT DOCUMENTS

| | | |
|---|---|---|
| JP | 2004-260317 A | 9/2004 |
| JP | 2010-527518 A | 8/2010 |
| JP | 2010-532616 A | 10/2010 |
| JP | 2011-507449 A | 3/2011 |
| KR | 10-2003-0048568 A | 6/2003 |
| KR | 10-2006-0060234 A | 6/2006 |
| KR | 1020080050238 A | 6/2008 |
| KR | 1020090023937 A | 3/2009 |
| WO | WO 2008/097611 A2 | 8/2008 |
| WO | WO 2008/154161 A1 | 12/2008 |
| WO | WO 2009/005212 A1 | 1/2009 |
| WO | WO 2009/078598 A1 | 6/2009 |

* cited by examiner

*Primary Examiner* — Alvin Zhu

(57) ABSTRACT

In a system for providing an IPTV service, if a multicast address of an IPTV channel received from a head-end is a multicast address requested by a mobile node through a tunnel, an end router confirms a care of address (CoA) of the mobile node corresponding to the multicast address of the IPTV channel, sets the multicast address in the first header of broadcasting traffic, sets the CoA of the mobile node in the second header of the broadcasting traffic, and then sends the broadcasting traffic.

17 Claims, 11 Drawing Sheets

| Multicast address | Output interface information (tunnel indicator) |

| HoA | CoA | Multicast address |

SYSTEM AND METHOD FOR PROVIDING IPTV SERVICE

CROSS-REFERENCE TO RELATED APPLICATION

This application claims priority to and the benefit of Korean Patent Application Nos. 10-2009-0076909 and 10-2010-0065429 filed in the Korean Intellectual Property Office on Aug. 19, 2009 and Jul. 7, 2010, the entire contents of which are incorporated herein by reference.

BACKGROUND OF THE INVENTION (a) Field of the Invention

The present invention relates to a system and method for providing IPTV (Internet protocol television) service.

(b) Description of the Related Art

Multicasting is a one-to-many communication method. In multicasting, traffic is transmitted to only a specific group, and traffic can be transmitted via a router which is the boundary of a local network. In a conventional multicast-based IPTV service, multicast traffic flows in a network and thus a load on network performance increases. This makes it difficult to guarantee stability of a network.

In order to solve the problem, a technique for distributing a head-end into subscriber networks has been proposed. However, with the head-end distributed into the subscriber networks, a burden of a broadcasting server to update contents is increased, and costs for installing and maintaining broadcasting servers are increased.

Further, the conventional multicast-based IPTV service is problematic in that it does not support mobility.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system and method for providing an IPTV service having advantages of reducing a load on network performance and supporting mobility of a mobile node.

According to an exemplary embodiment of the present invention, a method of an end router providing IPTV service is provided. The method of providing an IPTV service includes, if a multicast address of an IPTV channel received from a head-end is a multicast address requested by a mobile node through a tunnel, confirming a care of address (CoA) of the mobile node corresponding to the multicast address of the IPTV channel and setting the multicast address in a first header of broadcasting traffic, setting the CoA of the mobile node in a second header of the broadcasting traffic, and sending the broadcasting traffic.

According to another exemplary embodiment of the present invention, a method of an end router providing an IPTV service is provided. The method of providing an IPTV service includes receiving broadcasting data of an IPTV channel from a head-end, including broadcasting data in the payload of broadcasting traffic, setting the multicast address of the IPTV channel in the first header of the broadcasting traffic, setting a CoA of a mobile node corresponding to the multicast address in the second header of the broadcasting traffic, and sending the broadcasting traffic.

According to yet another exemplary embodiment of the present invention, a system for providing an IPTV service is provided. The system for providing an IPTV service includes a multicast routing table, a multicast tunnel table, and a controller. The multicast routing table stores multicast addresses of IPTV channels requested by a plurality of mobile nodes through a tunnel. The multicast tunnel table maps HoAs and CoAs of the plurality of mobile nodes to the multicast addresses requested by the plurality of mobile nodes and stores the mapped HoAs, CoAs, and multicast addresses. Further, when the broadcasting data of a specific IPTV channel are received from a head-end, the controller includes the broadcasting data in the payload of broadcasting traffic, sets the multicast address of the specific IPTV channel in the first header of the broadcasting traffic, sets the CoA of a mobile node, corresponding to the multicast address of the specific IPTV channel, in the second header of the broadcasting traffic with reference to a multicast tunnel table, and sends the broadcasting traffic through the tunnel.

BRIEF DESCRIPTION OF THE DRAWINGS

FIG. 4 is a diagram showing a multicast routing table shown in FIG. 3;

FIG. 5 is a diagram showing a multicast tunnel table shown in FIG. 3;

DETAILED DESCRIPTION OF THE EMBODIMENTS

Figure 1:
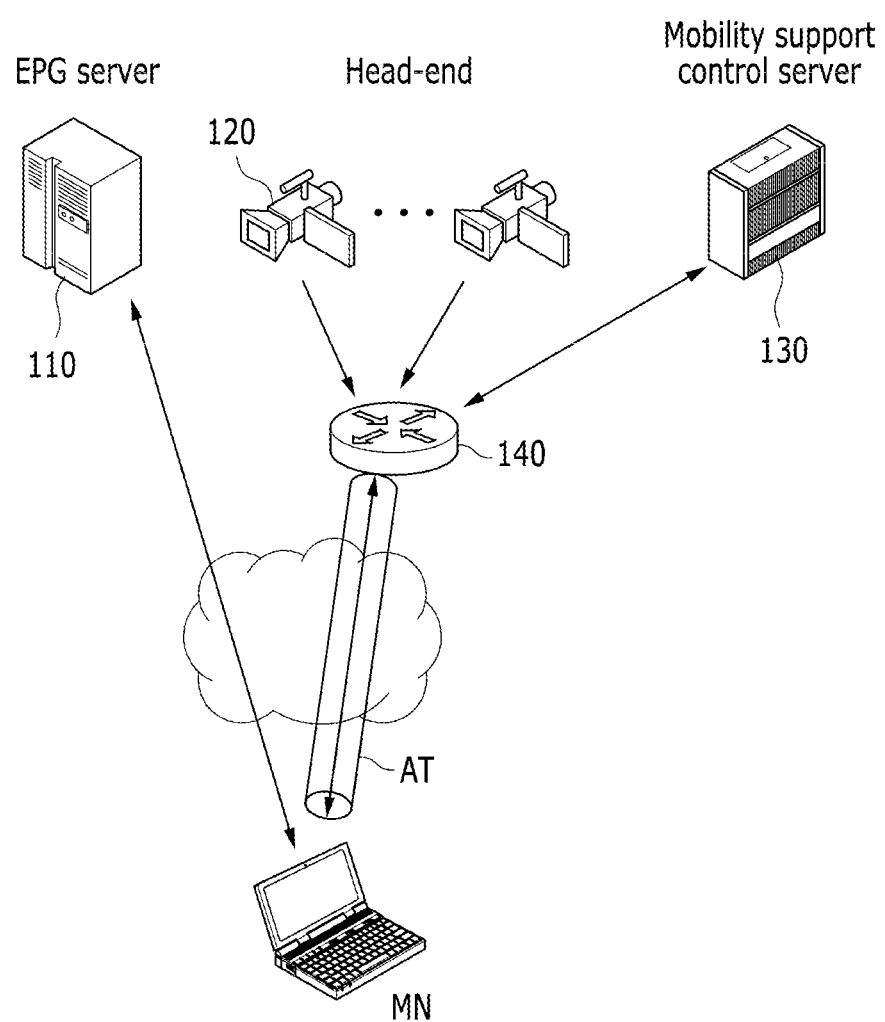
FIG. 1 is a diagram showing a system for providing an IPTV service according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification and the entire claim, unless explicitly described to the contrary, the word "comprise" and variations such as "comprises" or "comprising" will be understood to imply the inclusion of stated elements but not the exclusion of any other elements.

Hereinafter, a system and method for providing an IPTV service for tunnel-based mobility support according to some exemplary embodiments of the present invention is described with reference to the accompanying drawings.

FIG. 1 is a diagram showing a system for providing an IPTV service for tunnel-based mobility support according to an exemplary embodiment of the present invention.

Referring to FIG. 1, the system for providing an IPTV service for tunnel-based mobility support includes an electronic program guide (EPG) server 110, head-ends 120, a mobility support control server 130, an end router 140, and a plurality of mobile nodes MN.

The EPG server 110 provides IPTV (Internet protocol television) program guide information. The IPTV program guide information includes detailed information, such as broadcasting schedule tables and synopses of broadcasting programs for respective IPTV channels, and multicast addresses and port information for respective IPTV channels.

The head-end 120 manages IPTV channel-based broadcasting traffic and provides the IPTV channel-based broadcasting traffic to the end router 140.

When tunnel creation requests are received from the plurality of respective mobile nodes MN via the end router 140, the mobility support control server 130 transfers the tunnel creation requests to the end router 140 so that a tunnel between the end router 140 and the mobile nodes MN can be established. The tunnel creation request can include a home address (HoA) and care of address (CoA) of a mobile node MN, and information about whether a NAT or a firewall exists. Here, the HoA is a unique address of a mobile node MN, and it functions as the identifier of a mobile node MN. The CoA is a new address created in a network to which a mobile node MN has moved and changed according to the movement of an access network.

More particularly, the mobility support control server 130 instructs the end router 140 to establish a tunnel, while transferring the HoA and CoA of a mobile node MN, and information about whether a NAT or a firewall exists to the end router 140. Further, the mobility support control server 130 sends the address (i.e., tunnel termination information) of the end router 140 to the mobile node MN.

When a tunnel creation request is received from the mobility support control server 130, the end router 140 sets one available interface and an active tunnel AT for a mobile node MN, and also simultaneously sets a standby tunnel (not shown) with the active tunnel AT in preparation for service restrictions to the active tunnel AT. Here, the active tunnel AT is used to transmit and receive not only control messages, but also data traffic (i.e., broadcasting traffic). The standby tunnel does not intervene in the transmission and reception of substantial data traffic, and it is an auxiliary tunnel that periodically transmits and receives control messages.

As described above, the end router 140 can set an active tunnel AT and a standby tunnel in response to a tunnel creation request received from the mobility support control server 130, and can support the mobility of a mobile node MN.

Further, the end router 140 manages the HoA and CoA of a mobile node MN for which an active tunnel AT has been set, and information about whether a NAT or a firewall exists.

On the one hand, according to an exemplary embodiment of the present invention, the mobility support control server 130 may not directly transfer a tunnel creation request received from a mobile node MN to the end router 140, but may directly set an active tunnel AT with a mobile node MN.

Conventionally, the mobility support control server 130 sets a tunnel with a mobile node MN and transmits and receives data traffic to and from the mobile node MN through the tunnel. According to an exemplary embodiment of the present invention, the establishment of a tunnel between the mobility support control server 130 and a mobile node MN can be shared and processed by the mobility support control server 130 and the end router 140. As described above, if the establishment of a tunnel between the mobility support control server 130 and a mobile node MN is shared and processed by the mobility support control server 130 and the end router 140, a load on the mobility support control server 130 can be reduced.

The end router 140 according to an exemplary embodiment of the present invention manages broadcasting traffic for each IPTV channel, received from the head-end 120 and provides a mobile node MN with the broadcasting traffic of an IPTV channel, selected by the mobile node MN, through an active tunnel AT. Here, the end router 140 transmits broadcasting traffic to the mobile node MN using a multicast address as a final destination address and the CoA of the mobile node MN as the end address of the tunnel by taking the mobility of the mobile node MN into consideration. In this case, the mobile node MN can be consecutively provided with the broadcasting traffic even though it moves to another access network. Further, since the broadcasting traffic is transferred through the active tunnel AT, a load on network performance can be reduced.

The mobile node MN refers to a moving terminal, and has a plurality of interfaces for setting a standby tunnel for access and movement to a heterogeneous network. Accordingly, the mobile node MN can move while changing an access network according to its location.

The mobile node MN requests the creation of a tunnel using a tunnel creation message, requests the broadcasting traffic of an IPTV channel using an active tunnel AT established between it and the end router 140, and receives the broadcasting traffic of the IPTV channel from the end router 140 through the active tunnel AT. When the active tunnel AT between the mobile node MN and the end router 140 is setted, the mobile node MN stores and manages its own HoA and the address of the end router 140 as tunnel address information.

Further, the mobile node MN can perform communication with a correspondent node that it wants to communicate with through the active tunnel AT.

Figure 2:
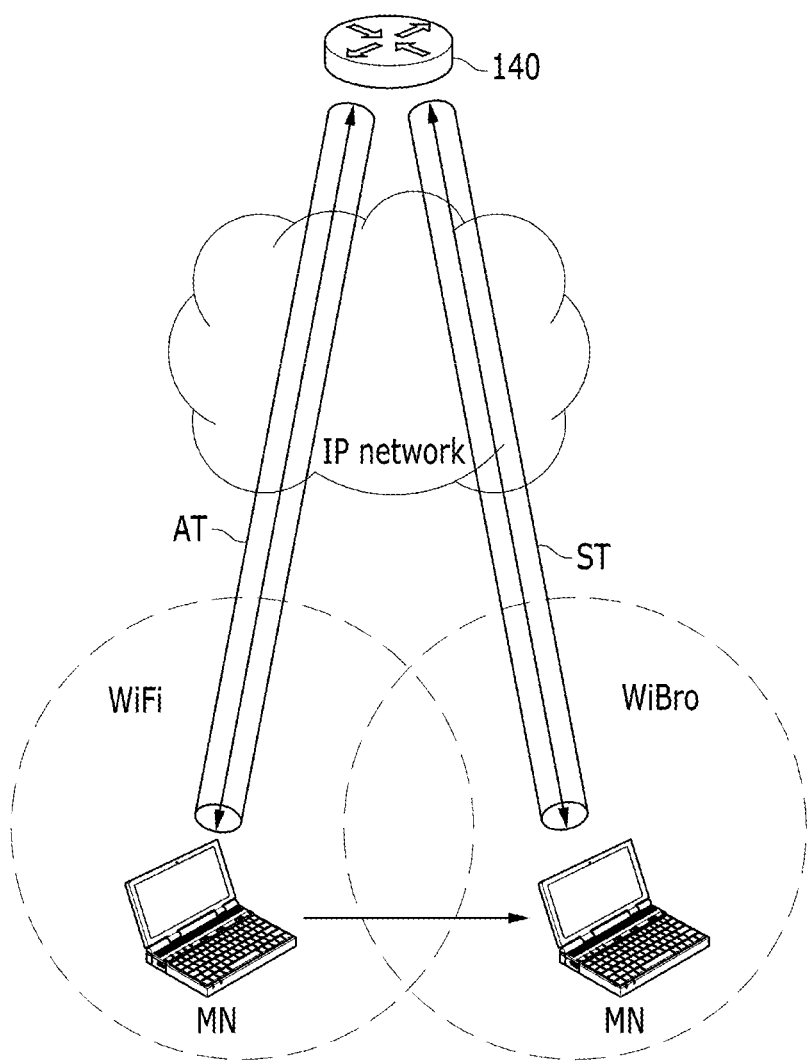
FIG. 2 is a diagram showing a method of an end router providing tunnel-based mobility to mobile nodes according to an exemplary embodiment of the present invention.

FIG. 2 is a diagram showing a method of an end router providing tunnel-based mobility to mobile nodes according to an exemplary embodiment of the present invention. In FIG. 2, only one mobile node MN and one end router 140 are shown for convenience of description.

Referring to FIG. 2, the end router 140 establishes an active tunnel AT with the mobile node MN in response to a tunnel creation request, and establishes a standby tunnel ST in preparation for service restrictions to the active tunnel AT.

That is, when the movement of the mobile node MN from a first network (e.g., WiFi) to a second network (e.g., WiBro) is detected, the end router 140 can change a previously set-up standby tunnel ST to an active tunnel AT, and at the same time set a new standby tunnel ST.

Figure 3:
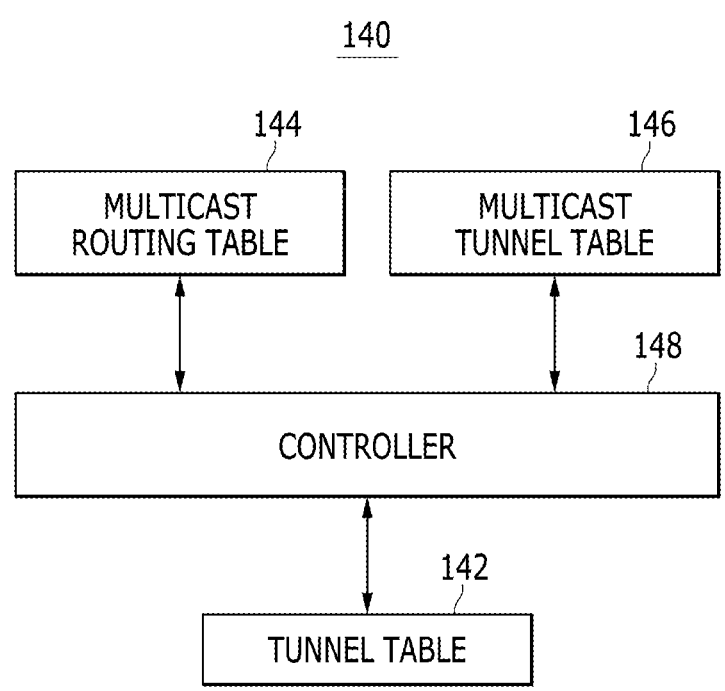
FIG. 3 is a diagram showing an end router according to an exemplary embodiment of the present invention.
Figure 5:
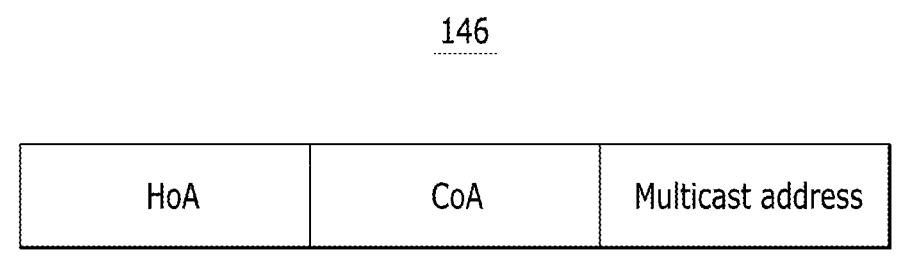

FIG. 3 is a diagram showing an end router according to an exemplary embodiment of the present invention, FIG. 4 is a diagram showing a multicast routing table shown in FIG. 3, and FIG. 5 is a diagram showing a multicast tunnel table shown in FIG. 3.

Referring to FIG. 3, the end router 140 according to an exemplary embodiment of the present invention includes a tunnel table 142, a multicast routing table 144, a multicast tunnel table 146, and a controller 148.

The HoA and CoA of a mobile node MN are stored in the tunnel table 142.

Multicast addresses and output interface information are stored in the multicast routing table 144. Here, the output interface information can include a tunnel indicator. The tunnel indicator can be set in the case in which a channel request message, including the multicast address of an IPTV channel requested by a mobile node MN, is received through a tunnel.

In other words, as shown in FIG. 4, the multicast routing table 144 stores a tunnel indicator as output interface information in response to the multicast address.

The HoA, CoA, and multicast address of a mobile node MN are stored in the multicast tunnel table 146. Here, the CoA can include the address of the mobility support control server 130 according to whether a NAT or a firewall exists. That is, as shown in FIG. 5, the multicast tunnel table 146 stores the multicast address mapped to the HoA and CoA of the mobile node MN.

Referring back to FIG. 3, when a tunnel creation message, including the HoA and CoA of a mobile node MN and information about whether a NAT or a firewall exists, is received from the mobility support control server 130, the controller 148 establishes an active tunnel AT and a standby tunnel ST for communication with the mobile node MN. Next, the controller 148 maps the HoA and CoA of the mobile node MN and stores the mapped HoA and CoA in the tunnel table 142.

More particularly, in the case in which the HoA of the mobile node MN does not exist in the tunnel table 142, the controller 148 stores the HoA and CoA of the mobile node MN in the tunnel table 142. When the mobile node MN moves to another access network such that the CoA of the mobile node MN is changed, the controller 148 updates the CoA of the mobile node MN in the tunnel table 142. If the CoA of the mobile node MN is changed, the mobile node MN sends the changed CoA to the controller 148 so that the controller 148 can update the CoA of the mobile node MN. Through the above, the controller 148 can manage the HoA and CoA of the mobile node MN using the tunnel table 142.

Further, when a channel request message, including the HoA of a mobile node MN and the multicast address of an IPTV channel selected by the mobile node. MN, is received from the mobile node MN through an active tunnel AT, the controller 148 sets a tunnel indicator by mapping the tunnel indicator to a multicast address included in the channel request message and stores the multicast address and the tunnel indicator in the multicast routing table 144. That is, when the channel request message is received through the active tunnel AT, the controller 148 can set the tunnel indicator by mapping the tunnel indicator to the multicast address.

As described above, after the tunnel indicator is set in the multicast address, the controller 148 searches the tunnel table 142 for a CoA corresponding to the HoA of the mobile node MN, included in the channel request message, maps the multicast address selected by the mobile node MN to the HoA and CoA of the mobile node MN, and stores the mapped multicast address, HoA, and CoA in the multicast tunnel table 146. In this manner, the controller 148 can manage information about the multicast tunnel table 146.

Thereafter, when the broadcasting traffic of an IPTV channel is received from the head-end 120, the controller 148 sets a CoA of the mobile node MN corresponding to the multicast address, set in the header of the broadcasting traffic of the IPTV channel, with reference to the multicast routing table 144 and the multicast tunnel table 146, and sends the broadcasting traffic. Here, the multicast address set in the header of the broadcasting traffic of the IPTV channel has been set.

Figure 6:
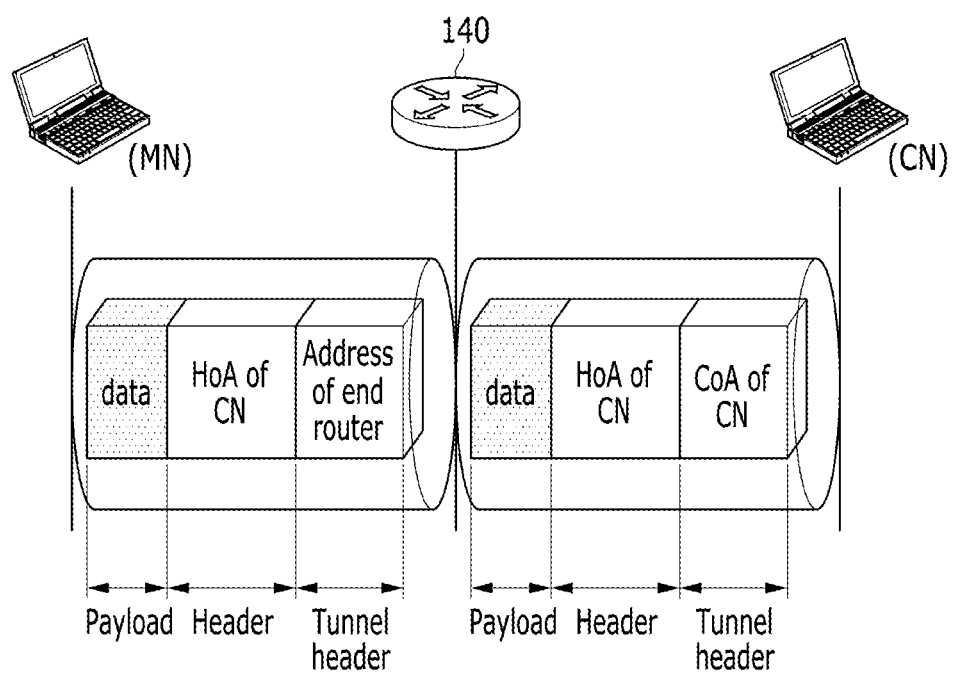
FIG. 6 is a diagram showing a method of transmitting and receiving tunnel-based data traffic between a mobile node and a correspondent node.

FIG. 6 is a diagram showing a method of transmitting and receiving tunnel-based data traffic between a mobile node MN and a corresponding node CN. In FIG. 6, the other mobile node MN communicating with one mobile node MN is shown as a corresponding node CN.

Referring to FIG. 6, the mobile node MN sends data traffic in which data are loaded on a payload, an HoA of the correspondent node CN (i.e., destination information) is set in a header, and an address of the end router 140 (i.e., termination information about a tunnel) is set in a tunnel header.

The end router 140 receives data traffic in which information of a tunnel header corresponds to its own address.

The end router 140 searches the tunnel table 142 for a CoA of the correspondent node CN corresponding to the HoA of the correspondent node CN set in the header of the data traffic. Next, the end router 140 loads data on the payload, sets the HoA of the correspondent node CN (i.e., destination information) in the header, sets the CoA of the correspondent node CN in the tunnel header, and sends the data traffic. Strictly speaking, the CoA of the correspondent node CN is additionally set in the tunnel header of the data traffic, and the data traffic is sent. That is, the data are loaded on the payload of the data traffic, and the HoA of the correspondent node CN (i.e., destination information) is set in the header of the data traffic. Accordingly, the end router 140 additionally sets the CoA of the correspondent node CN in the tunnel header of the data traffic and sends the data traffic. Thus, the correspondent node CN can receive data traffic corresponding to its own CoA. That is, although a mobile node MN sends data traffic to the HoA of a correspondent node CN, the end router 140 sends data traffic to the CoA of the correspondent node CN. Accordingly, the correspondent node CN can receive the data traffic sent by the mobile node MN even though the correspondent node CN has moved to another access network that is not a home network.

Figure 7:
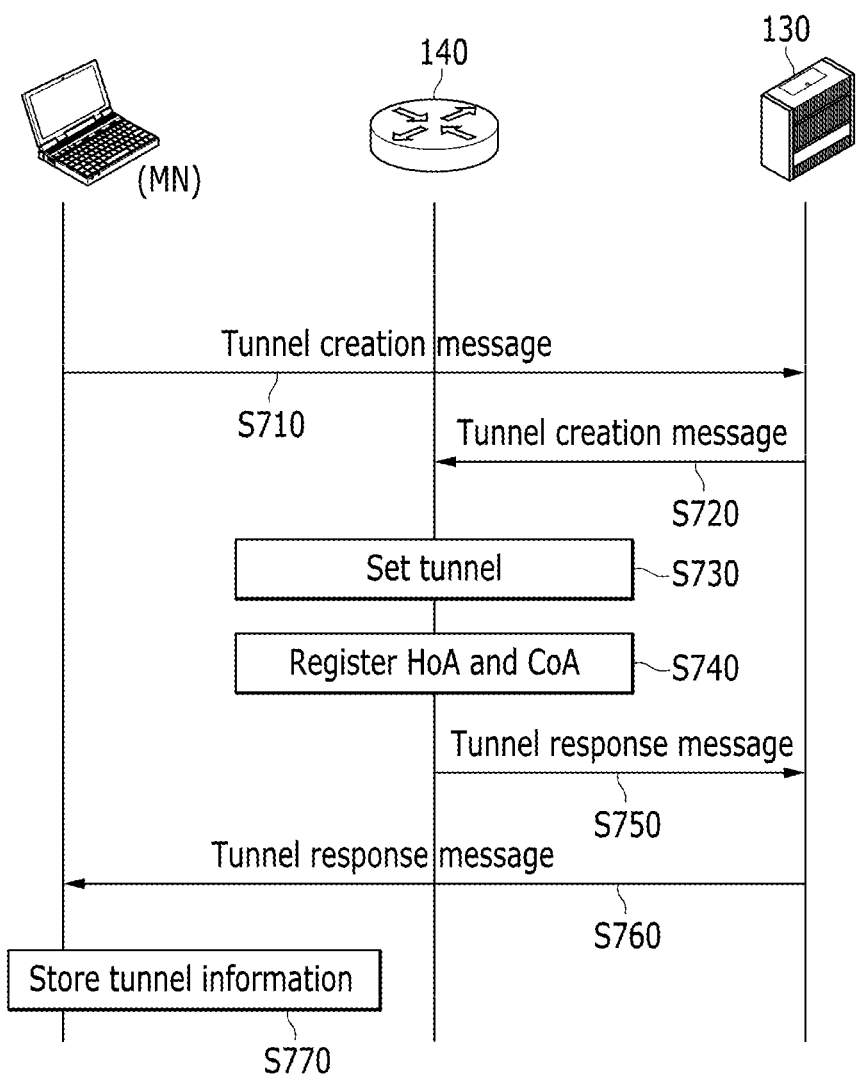
FIG. 7 is a diagram showing a method of an end router setting a tunnel with a mobile node according to an exemplary embodiment of the present invention.

FIG. 7 is a diagram showing a method of an end router setting a tunnel with a mobile node according to an exemplary embodiment of the present invention.

Referring to FIG. 7, the mobile node MN requests the creation of a tunnel by sending a tunnel creation message using the address of the mobility support control server 130 as a destination at step S710. Here, the tunnel creation message includes the HoA and CoA of the mobile node MN and information about whether a NAT or a firewall exists.

The mobility support control server 130 that has received the tunnel creation message sends the tunnel creation message to the end router 140 and requests the end router 140 to create a tunnel at step S720.

The end router 140 that has received the tunnel creation message sets an active tunnel AT with the mobile node MN and sets a standby tunnel ST in preparation for service restrictions to the active tunnel AT at step S730.

Next, the end router 140 registers the HoA and CoA of the mobile node MN with the tunnel table 142 at step S740.

After the tunnels with the mobile node MN are established, the end router 140 sends a tunnel response message for the tunnel creation message to the mobility support control server 130 at step S750.

The mobility support control server 130 that has received the tunnel response message transfers the tunnel response message to the mobile node MN using the HoA of the mobile node MN as destination information at step S760. Here, the tunnel response message can include the address of the end router 140 which is termination information of the active tunnel AT.

The mobile node MN sets a tunnel with the end router 140 on the basis of the termination information included in the received tunnel response message Next, the mobile node MN stores the address of the end router 140, together with its own HoA at step S770.

Figure 8:
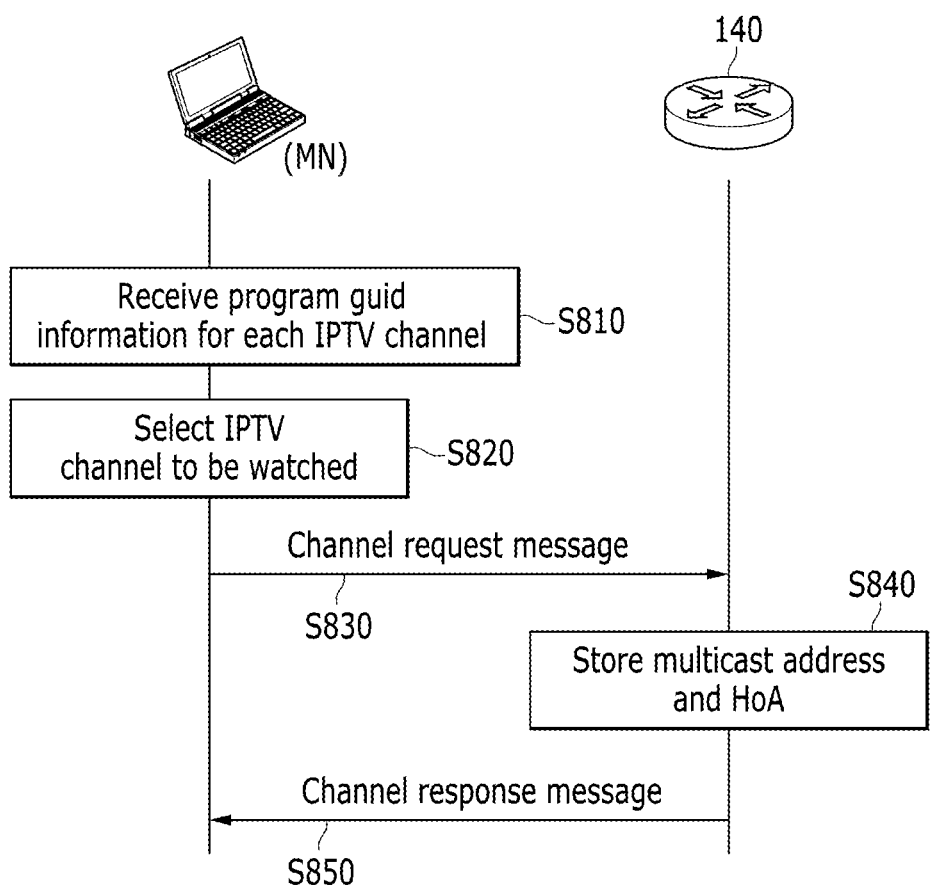
FIG. 8 is a diagram showing a method of an end router managing a multicast tunnel table according to an exemplary embodiment of the present invention.

FIG. 8 is a diagram showing a method of an end router managing a multicast tunnel table according to an exemplary embodiment of the present invention.

Referring to FIG. 8, the mobile node MN accesses the EPG server 110 and receives program guide information for each IPTV channel therefrom at step S810.

The mobile node MN selects an IPTV channel to be watched from the program guide information for respective IPTV channels at step S820. Here, the mobile node MN stores the multicast address of the selected IPTV channel, together with its own HoA.

Next, the mobile node MN sends a channel request message, including its own HoA and the multicast address of the selected IPTV channel, to the end router 140 through an active tunnel AT at step S830. Here, the mobile node MN can set its own HoA as the source address of a header, set the address of an end router in a tunnel header, and send the channel request message to the end router 140 through the active tunnel AT.

The end router 140 receives a channel request message corresponding to its own address.

The end router 140 that has received the channel request message sets a tunnel indicator by mapping the tunnel indicator to a multicast address included in the channel request message, stores the set tunnel indicator in the multicast routing table 144, searches the tunnel table 142 for a CoA corresponding to the HoA included in the header of the channel request message, maps the HoA, the CoA, and the multicast address, and stores the mapped HoA, CoA, and multicast address in the multicast tunnel table 146.

The end router 140 can determine whether the corresponding IPTV channel has been created or changed on the basis of the multicast address included in the channel request message. If the mobile node MN requests the end router 140 to create an IPTV channel, the end router 140 registers a multicast address with the multicast routing table 144 and the multicast tunnel table 146. Next, if the mobile node MN requests the end router 140 to change the corresponding IPTV channel using a channel request message, the end router 140 can update the multicast address registered with the multicast routing table 144 and the multicast tunnel table 146 to the multicast address of a changed IPTV channel. Further, if the mobile node MN requests the end router 140 to delete the corresponding IPTV channel, the end router 140 may delete the multicast address registered with the multicast routing table 144 and the multicast tunnel table 146.

As described above, after storing the multicast address in the multicast routing table 144 and the multicast tunnel table 146, the end router 140 sends the channel response message for the channel request message through the active tunnel AT at step S850.

Figure 9:
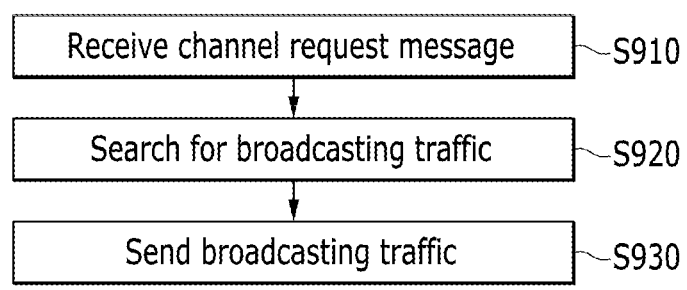
FIG. 9 is a diagram showing a method of providing an IPTV service according to an exemplary embodiment of the present invention.

FIG. 9 is a diagram showing a method of providing IPTV service according to an exemplary embodiment of the present invention.

Referring to FIG. 9, when a channel request message is received from the mobile node MN at step S910, the end router 140 searches a plurality of IPTV channels received from the head-end 120 for the broadcasting traffic of an IPTV channel corresponding to the multicast address of an IPTV channel selected by the mobile node MN at step S920. The broadcasting traffic has broadcasting data loaded on a payload, and the multicast address of the IPTV channel, selected by the mobile node MN, set in a header.

The end router 140 searches the multicast routing table 144 and the multicast tunnel table 146 for a CoA of the mobile node MN using the multicast address as a key, loads the broadcasting data on the payload of the broadcasting traffic, sets the multicast address of the IPTV channel selected by the mobile node MN in the header of the broadcasting traffic, sets the CoA of the mobile node MN in the tunnel header of the broadcasting traffic, and sends the broadcasting traffic at step S930. Strictly speaking, the broadcasting data are loaded on the payload of the broadcasting traffic, and the multicast address of the IPTV channel selected by the mobile node MN is set in the header of the broadcasting traffic. The end router 140 additionally sets the CoA of the mobile node MN in the tunnel header of the broadcasting traffic and sends the broadcasting traffic.

Accordingly, the mobile node MN can receive broadcasting traffic by extracting the broadcasting traffic to be received on the basis of the CoA included in the tunnel header of the broadcasting traffic.

Further, the end router 140 can set the CoA of the mobile node MN in the tunnel header of the broadcasting traffic and send the broadcasting traffic. Accordingly, the mobile node MN can receive selected broadcasting traffic even though it moves to another access network.

Figure 10:
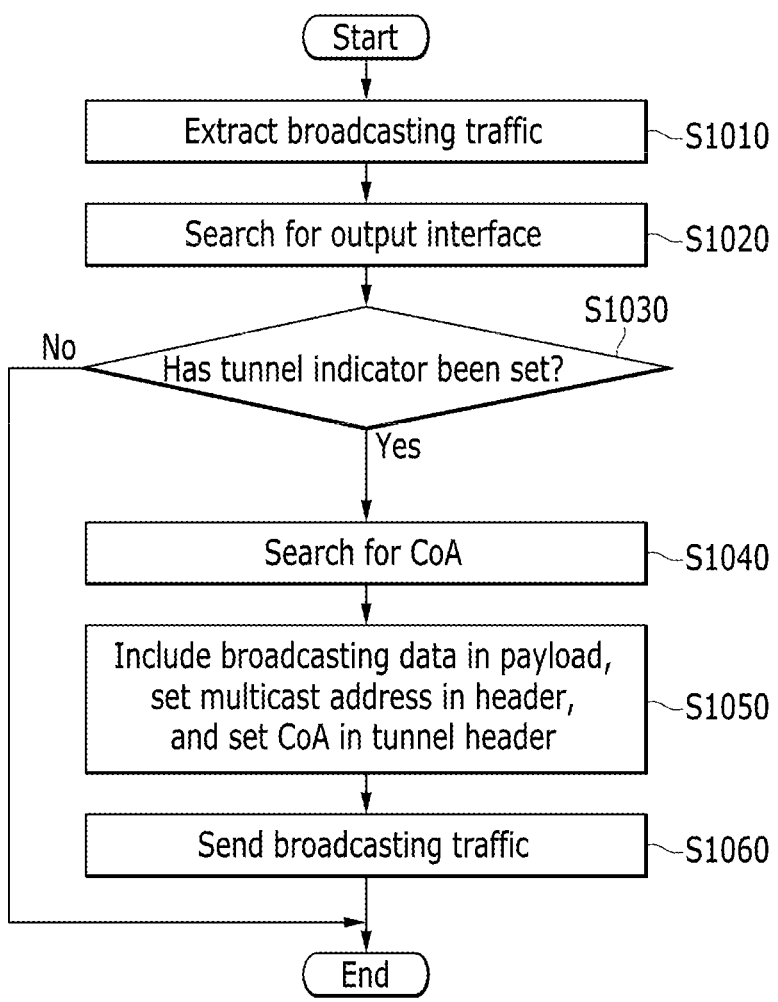
FIGS. 10 and 11 are diagrams showing a method of an end router transferring broadcasting traffic according to an exemplary embodiment of the present invention.
Figure 11:
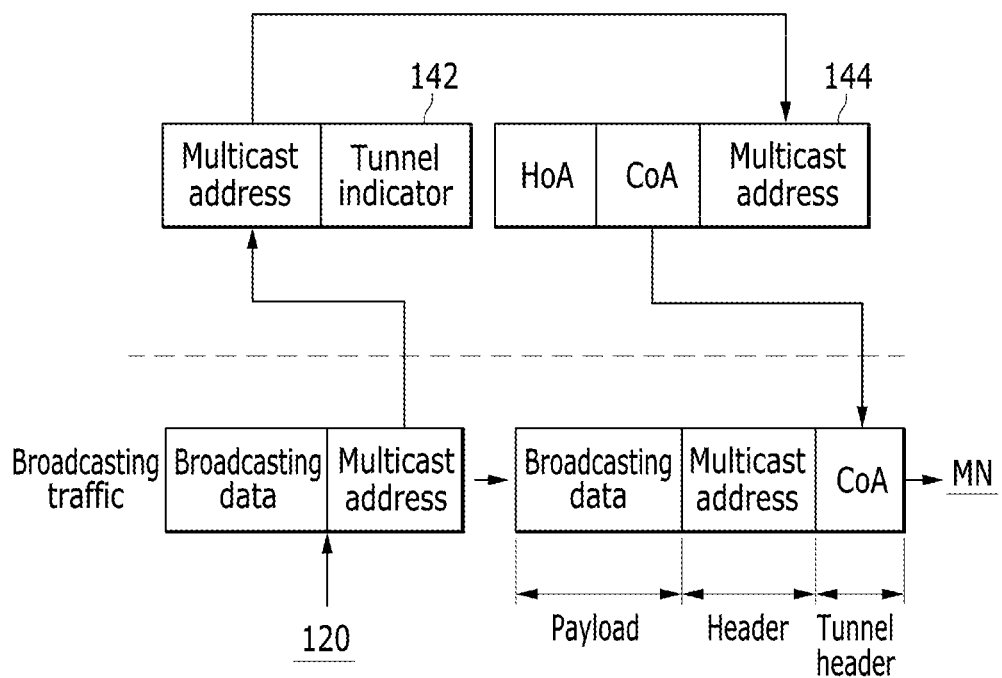

FIGS. 10 and 11 are diagrams showing a method of an end router transferring broadcasting traffic according to an exemplary embodiment of the present invention.

Referring to FIGS. 10 and 11, when a channel request message is received from the mobile node MN, the end router 140 extracts the broadcasting traffic of an IPTV channel, having the same multicast address as an IPTV channel included in the channel request message, from a plurality of IPTV channels received from the head-end 120 at step S1010.

Next, the end router 140 searches the multicast routing table 144 for output interface information corresponding to the multicast address of the extracted broadcasting traffic at step S1020. Here, if a tunnel indicator is set in the output interface information at step S1030, the end router 140 searches the multicast tunnel table 146 for a CoA of the mobile node MN corresponding to the multicast address of the broadcasting traffic at step S1040.

Next, the end router 140 additionally sets the CoA of the mobile node MN in the tunnel header of the broadcasting traffic at step S1050 and sends the broadcasting traffic at step S1060.

As described above, when the CoA of the mobile node MN is set in the tunnel header of the broadcasting traffic and the broadcasting traffic is sent, the mobile node MN can receive the broadcasting traffic sent by the end router 140 even though it moves to another access network. That is, although the mobile node MN moves to another access network, the mobile node MN can be continuously provided with an IPTV service.

According to an exemplary embodiment of the present invention, tunnel-based mobility for a mobile node can be supported and at the same time a multicast-based IPTV service can be provided to the mobile node. Further, in providing a multicast-based IPTV service, the multicast-based IPTV service is provided using a tunnel in a termination network. Accordingly, the continuity of the service can be guaranteed and a load on network performance can be reduced.

The exemplary embodiments of the present invention are not implemented only through the method and apparatus, but may be implemented through a program for realizing a function corresponding to a construction according to an exemplary embodiment of the present invention or a recording medium on which the program is recorded. The implementations will be evident to those having ordinary skill in the art to which the present invention pertains from the embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of an end router coupled to a mobility support control server and providing an IPTV (Internet Protocol Television) service, the method comprising:
   receiving, by the end router, a tunnel creation message including a home address (HoA) and CoA of a mobile node from the mobility support control server;
   setting, by the end router, the tunnel for communication with the mobile node;
   mapping the CoA and HoA of the mobile node and storing the mapped CoA and HoA in a tunnel table stored in the end router;
   if a multicast address of an IPTV channel received by the end router from a head-end is a multicast address requested by a mobile node through the tunnel, confirming the care of address (CoA) of the mobile node corresponding to the multicast address of the IPTV channel; and
   setting the multicast address in a first header of broadcasting traffic, setting the CoA of the mobile node in a second header of the broadcasting traffic, and sending the broadcasting traffic from the end router,
   wherein the end router is coupled to a head end and disposed on the head end side of the tunnel.

2. The method of claim 1, further comprising receiving a channel request message, including the multicast address of the IPTV channel, from the mobile node through the tunnel before confirming the CoA of the mobile node.

3. The method of claim 2, further comprising
   setting a tunnel indicator by mapping the tunnel indicator to the multicast address of the IPTV channel received through the tunnel,
   wherein confirming the CoA of the mobile node includes determining that the multicast address is the multicast address requested through the tunnel if the tunnel indicator is set in the multicast address.

4. The method of claim 1, wherein setting the multicast address in the first header of broadcasting traffic and setting the CoA of the mobile node in the second header of the broadcasting traffic further include setting another tunnel in preparation for service restrictions to the tunnel.

5. The method of claim 1, further comprising:
   before confirming the CoA of the mobile node,
   receiving a channel request message, including the multicast address of the IPTV channel, from the mobile node through the tunnel;
   searching a CoA corresponding to the HoA of the mobile node with reference to the tunnel table; and
   storing the multicast address and the searched CoA in a multicast tunnel table with reference to the HoA of the mobile node.

6. The method of claim 5, wherein confirming the CoA of the mobile node includes confirming the CoA of the mobile node corresponding to the multicast address with reference to the multicast tunnel table.

7. The method of claim 1, wherein sending the broadcasting traffic includes sending the broadcasting traffic through the tunnel.

8. A method of an end router coupled to a mobility support control server and providing IPTV (Internet Protocol Television) service, the method comprising:
   receiving, by the end router, broadcasting data of an IPTV channel from a head-end;
   including the broadcasting data in a payload of broadcasting traffic sent from the end router;
   setting a multicast address of the IPTV channel in a first header of the broadcasting traffic;
   setting a care of address (CoA) of a mobile node corresponding to the multicast address in a second header of the broadcasting traffic;
   transmitting a tunnel creation message including a home address (HoA) and the CoA of a mobile node from the mobility support control server to the end router; and
   sending the broadcasting traffic from the end router,
   wherein the end router is coupled to a head end and disposed on a head end side of a tunnel.

9. The method of claim 8, wherein setting the CoA of the mobile node includes confirming the CoA of the mobile node, corresponding to the multicast address, if the multicast address of the IPTV channel is a multicast address requested by the mobile node through a tunnel.

10. The method of claim 9, wherein setting the CoA of the mobile node further includes receiving a channel request message, including the multicast address of the IPTV channel, from the mobile node through the tunnel.

11. The method of claim 10, further comprising mapping the CoA and HoA of the mobile node and storing the mapped CoA and HoA in a tunnel table.

12. The method of claim 11, further comprising:
   receiving a channel request message, including the multicast address of the IPTV channel, from the mobile node through the tunnel;
   searching a CoA corresponding to the HoA of the mobile node with reference to the tunnel table; and
   mapping the multicast address to the HoA and CoA of the mobile node and storing the mapped multicast address, HoA, and CoA in a multicast tunnel table.

13. The method of claim 12, wherein setting the CoA of the mobile node includes searching the CoA of the mobile node corresponding to the multicast address with reference to the multicast tunnel table.

14. The method of claim 8, wherein the second header is placed ahead of the first header.

15. A system for providing IPTV service, the system comprising:
   an end router coupled to the mobility support control server and disposed on a head end side of a tunnel between the end router and a mobile node, the end router including:
   a multicast routing table comprising a plurality of multicast addresses of IPTV (Internet Protocol Television) channels requested by a plurality of mobile nodes through the tunnel;
   a multicast tunnel table configured to map home addresses (HoAs) and care of addresses (CoAs) of the plurality of mobile nodes to the multicast addresses requested by the plurality of mobile nodes and to store the mapped HoAs, CoAs, and multicast addresses; and
   a controller configured to, when broadcasting data of a specific IPTV channel are received from a head-end, include the broadcasting data in a payload of broadcasting traffic, set a multicast address of the specific IPTV channel in a first header of the broadcasting traffic, set a CoA of a mobile node, corresponding to the multicast address of the specific IPTV channel, in a second header of the broadcasting traffic with reference to the multicast tunnel table, and send the broadcasting traffic through the tunnel; and a mobility support control server configured to transmit a tunnel creation message to the end router, the tunnel creation message including a HoA and the CoA of the mobile node.

16. The system of claim 15, further comprising a tunnel table, wherein the controller stores the HoA and CoA of the mobile node in the tunnel table after setting the tunnel.

17. The system of claim 16, wherein the controller receives a channel request message, including a multicast address requested by the mobile node, from the mobile node, searches the tunnel table for the CoA of the mobile node with reference to the HoA of the mobile node, maps the multicast address to the HoA and CoA of the mobile node, and stores the mapped multicast address, HoA, and CoA in the multicast tunnel table.

\* \* \* \* \*